(12) United States Patent
Kim et al.

(10) Patent No.: US 7,272,345 B2
(45) Date of Patent: Sep. 18, 2007

(54) POWER COUPLING DEVICE AND IMAGE FORMING APPARATUS HAVING THE SAME

(75) Inventors: Jong-Tae Kim, Seoul (KR); Geun-Yong Park, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 125 days.

(21) Appl. No.: 11/184,802

(22) Filed: Jul. 20, 2005

(65) Prior Publication Data

US 2006/0018681 A1  Jan. 26, 2006

(30) Foreign Application Priority Data

Jul. 23, 2004  (KR) ...................... 10-2004-0057783

(51) Int. Cl.
  *G03G 15/00*  (2006.01)
(52) U.S. Cl. .................. 399/167; 399/88; 399/117; 464/160
(58) Field of Classification Search ................. 399/167, 399/159, 88, 117, 116; 464/88, 160, 179, 464/182; 403/359.1, 359.6, 361, 383
  See application file for complete search history.

(56) References Cited

U.S. PATENT DOCUMENTS

| 3,447,392 | A | * | 6/1969 | Kawchitch | ................ | 464/88 X |
| 5,749,031 | A | * | 5/1998 | Miwa et al. | ............. | 464/160 X |
| 5,920,753 | A | * | 7/1999 | Sasaki et al. | ........... | 399/159 X |
| 6,035,159 | A | * | 3/2000 | Azuma et al. | .......... | 399/167 X |

| 2002/0172531 | A1 | * | 11/2002 | Harada et al. | ............... | 399/167 |
| 2004/0013448 | A1 | * | 1/2004 | Lee | ............................ | 399/159 |
| 2004/0190937 | A1 | * | 9/2004 | Mercer et al. | .............. | 399/117 |
| 2005/0111881 | A1 | * | 5/2005 | Arimitsu et al. | ............ | 399/167 |
| 2005/0191092 | A1 | * | 9/2005 | Toso et al. | ................... | 399/167 |
| 2005/0286931 | A1 | * | 12/2005 | Kim et al. | ................... | 399/167 |
| 2005/0286932 | A1 | * | 12/2005 | Kim et al. | ................... | 399/167 |
| 2005/0286933 | A1 | * | 12/2005 | Kim et al. | ................... | 399/167 |

FOREIGN PATENT DOCUMENTS

| JP | 04-014057 A | * | 1/1992 |
| JP | 08-194347 | | 7/1996 |
| JP | 09-258605 | | 10/1997 |
| JP | 2001-005291 A | * | 1/2001 |
| JP | 2001-337559 | | 12/2001 |

* cited by examiner

*Primary Examiner*—Sophia S. Chen
(74) *Attorney, Agent, or Firm*—Roylance, Abrams, Berdo & Goodman, LLP

(57) ABSTRACT

A power coupling device including a driving coupler mounted in the driving unit having a first connection part and a first positioning part; and a driven coupler mounted in the driven part having a second connection part and a second positioning part, respectively. The driven coupler having a first coupler member fixed to the driven part; a second coupler member having the second connection part and the second positioning part for connection with the first coupler member; and a connection for connecting the first coupler member with the second coupler member to control the connecting position. The connection means has a plurality of projections formed at one of the first and the second coupler members; and a plurality of depressions formed at the other one of the first and the second coupler members.

17 Claims, 7 Drawing Sheets

POWER COUPLING DEVICE AND IMAGE FORMING APPARATUS HAVING THE SAME

CROSS-REFERENCE TO RELATED APPLICATIONS

This application claims the benefit under 35 U.S.C. §119 (a) of Korean Patent Application No. 2004-57783, filed Jul. 23, 2004, in the Korean Intellectual Property Office, the entire disclosure of which is incorporated herein by reference.

BACKGROUND OF THE INVENTION

1. Field of the Invention

The present invention relates to a coupling device. More particularly, the present invention relates to a power coupling device for transmitting power between a driving unit of an organic photoconductor (OPC) of an electrophotographic image forming apparatus, and an image forming apparatus having the same.

2. Description of the Related Art

Electrophotographic image forming apparatuses include a photocopier, a printer, a facsimile and a word processor. In such image forming apparatuses, an electrostatic latent image is formed by exposing a photoconductive medium evenly electrified by an electrifying unit to a laser for forming an image. The electrostatic latent image is developed into a toner image by a developing unit having a toner. The toner image is transferred onto a recording medium by a transfer unit, thereby forming an image.

In the case of a color image forming apparatus, electrostatic latent images are formed on a plurality of photoconductive mediums for different colors, such as magenta, cyan, yellow and black, and developed by the respectively different colors of toner. The toner images of different colors are overlapped and transferred onto an intermediate recording medium, such as an intermediate transfer belt. The transferred intermediate toner images are transferred onto a final recording medium, thereby forming a color image on the final recording medium.

Here, since the intermediate transfer belt or the photoconductive mediums of different colors are expendables that have limited lifespans, they need to be replaced at the end of the expendable's lifespans.

Recently, image forming apparatuses have been provided with a process cartridge removably mounted in a main body thereof, wherein expendables such as the photoconductive medium, the electrifying unit, the developing unit and a cleaning unit are all integrated as one part. The process cartridge is removably mounted in the image forming apparatus by a driving unit for supplying power and a coupling device.

FIG. 1 schematically shows a conventional power coupling device of an image forming apparatus. The conventional power coupling device comprises a driving coupler 10 and a driven coupler 20.

The driving coupler 10 is rotatably mounted in a driving unit 1 in the image forming apparatus. The driving coupler 10 comprises a coupling recess 11 depressed by a certain depth and having a non-circular section, and a positioning recess 12 formed at one side of the coupling recess 11.

The driven coupler 20 comprises a coupling protrusion 21 fixed at one side of a photoconductive drum 2 and protruding by a certain height to correspond to the coupling recess 11, and a positioning protrusion 22.

Although schematically shown in the drawings, the driving coupler 10 and the driven coupler 20 are provided in different colors, and the power of the driving unit 1 can be transmitted to the respective photoconductive mediums 2 by coupling of the driving coupler 10 and the driven coupler 20, thereby rotating the photoconductive medium 2.

In the above-structured image forming apparatus, in order to implement color registration of high precision by reducing image offset incurred by errors such as a manufacturing error, a forming error and an assembly error, a method is used, which regulates the eccentricities of the respective photoconductive mediums 2 of different colors.

In other words, peak eccentric positions are checked, such as where radiuses of the respective photoconductive mediums 2 are the greatest, and the driven coupler 20 is fixed to the respective photoconductive mediums 2 in a manner that the positioning protrusion 22 of the driven coupler 20, for example, is located at the peak eccentric position, such that the photoconductive mediums 2 are coupled with the driving unit at the same phase. In this case, although the offset occurs with respect to the standard, the offset among the respective colors decreases. Therefore, the visual color registration seems insignificant.

However, according to the conventional method as described above, it is hard to select and group the photoconductive mediums 2 having the same peak eccentric positions because the peak eccentric positions of the photoconductive mediums 2 may change when fixing the driven coupler 20 to the photoconductive mediums 2 after measuring the peak eccentric positions of the respective photoconductive mediums 2.

Furthermore, using the conventional method, the color registration in consideration of the manufacturing error and the forming error can be compensated, however, the assembly error (for example, an error of a distance between the centers of the photoconductive mediums) may not be considered in compensating the color registration. Therefore, improvement in image quality is limited.

There are other ways for regulating the peak eccentric positions of the photoconductive mediums 2: one is using a driving system and a sensor clutch; and the other is using a plurality of motors corresponding to the number of the photoconductive mediums. In the former way, a certain position of the photoconductive medium is marked to be recognized as a sensor, such that the peak eccentric positions of the respective photoconductive mediums are uniformly driven. In the latter way, the respective photoconductive mediums are separately driven by the plurality of motors without an intermediate clutch.

However, the conventional methods as described above require an electronic controller or a controlling algorithm with a complicated structure. Therefore, they are not cost-effective or time-effective.

SUMMARY OF THE INVENTION

An aspect of the present invention is to solve at least the above problems and/or disadvantages and to provide at least the advantages described below. Accordingly, an aspect of the present invention is to provide an improved power coupling device capable of compensating color registration taking account of an assembly error as well as a manufacturing error and a forming error, without requiring an automatic controller having a complicated structure, and an image forming apparatus having the same.

In order to achieve the above-described aspects of the present invention, there is provided a power coupling device in which one of a driving coupler and a driven coupler provided in a driving part comprises a first coupler member and a second coupler member that are connected by a connection means.

According to an embodiment of the present invention, the power coupling device comprises a driving coupler mounted in the driving part and further comprises a first connection part and a first positioning part formed at one side of the first connection part, a driven coupler mounted in the driven part and a second connection part and a second positioning part respectively corresponding to the first connection part and the first positioning part. The driven coupler comprises a first coupler member fixed to the driven part, a second coupler member having the second connection part and the second positioning part for connection with the first coupler member, and a connection means for connecting the first coupler member with the second coupler member so that a connecting position of the second coupler member with respect to the first coupler member can be controlled.

The connection means comprises a plurality of projections formed at one of the first and the second coupler members, and a plurality of depressions formed at the other one of the first and the second coupler members.

The projections and the depressions may be formed by pins and pin holes, respectively. However, the projections and the depressions may be formed by square columns and square depressions, respectively, or any other suitable shape.

The driven part comprises a rotation shaft, and the first coupler member is fixed to the rotation shaft by a D-cut part, a pin, or a key.

The driven part has a peak eccentric position, and the second coupler member is positioned with respect to the first coupler member so that the second positioning part thereof corresponds to the peak eccentric position.

The driven part is a photoconductive medium, and the driving part is a driving unit of an image forming apparatus.

The first connection part of the driving coupler is formed as a substantially triangular recess, and the second connection part of the driven coupler is formed as a substantially triangular protrusion to correspond to the recess. The reverse structure may also be adopted.

The first positioning part of the driving coupler is formed as a recess, and the second positioning part of the driven coupler is formed as a protrusion. However, the structure can also be in reverse.

According to another embodiment of the present invention, there is provided a power coupling device for transferring the power of a driving part to a driven part, comprising a driving coupler mounted in the driving part and comprising a first connection part and a first positioning part formed at one side of the first connection part, and a driven coupler mounted in the driven part and comprising a second connection part and a second positioning part respectively corresponding to the first connection part and the first positioning part, wherein the driving coupler comprises a first coupler member fixed to the driving part, a second coupler member having the first connection part and the first positioning part for connection with the first coupler member, and a connection means for connecting the first coupler member with the second coupler member so that a connecting position of the second coupler member with respect to the first coupler member can be controlled.

In order to achieve another aspect of the present invention, there is provided an image forming apparatus comprising four photoconductive mediums for four different colors, being removably mounted in a main body thereof, a driving unit having four driving couplers for four different colors, the driving couplers comprising a first connection part depressed by a certain depth and having a non-circular section and a first positioning part formed at one side of the first connection part, so as to rotate the photoconductive mediums, and four driven couplers for four different colors, respectively mounted at the four photoconductive mediums to be coupled with the respective driving couplers. The four driven couplers respectively comprise a first coupler member fixed to the photoconductive medium, a second coupler member having the second connection part and the second positioning part corresponding to the first connection part and the first positioning part and connected with the first coupler member, and a connection means for connecting the first coupler member with the second coupler member so that a connecting position of the second coupler member with respect to the first coupler member can be controlled, and the four second coupler members are positioned with respect to the first coupler member so that the second positioning parts thereof correspond to the peak eccentric position of the photoconductive mediums, respectively.

The second coupler members are rotated by a certain angle $X°$, which is calculated by the following equation for connection with the first coupler members:

$$X°=[360°\times n\times(D-L)]/(\pi\times D) \qquad \text{Equation 1}$$

wherein, D denotes the diameter of the photoconductive medium, and L denotes the distance between centers of the photoconductive mediums.

Accordingly, the color registration can be compensated in consideration of even the assembly errors as well as the manufacturing errors and the forming errors of the photoconductive medium, and the image quality can be considerably improved.

BRIEF DESCRIPTION OF THE FIGURES

The above aspect and other features of the present invention will become more apparent by describing in detail exemplary embodiments thereof with reference to the attached drawing figures, wherein.

Throughout the figures, it should be understood that like reference numbers refer to similar features, elements and structures.

DETAILED DESCRIPTION OF EXEMPLARY EMBODIMENTS

Hereinafter, an embodiment of the present invention will be described in detail with reference to the accompanying drawing figures.

The matters defined in the description such as a detailed construction and elements provided to assist in a comprehensive understanding of the invention. A description of well-known functions or constructions has been omitted for the sake of clarity and conciseness.

Figure 1:
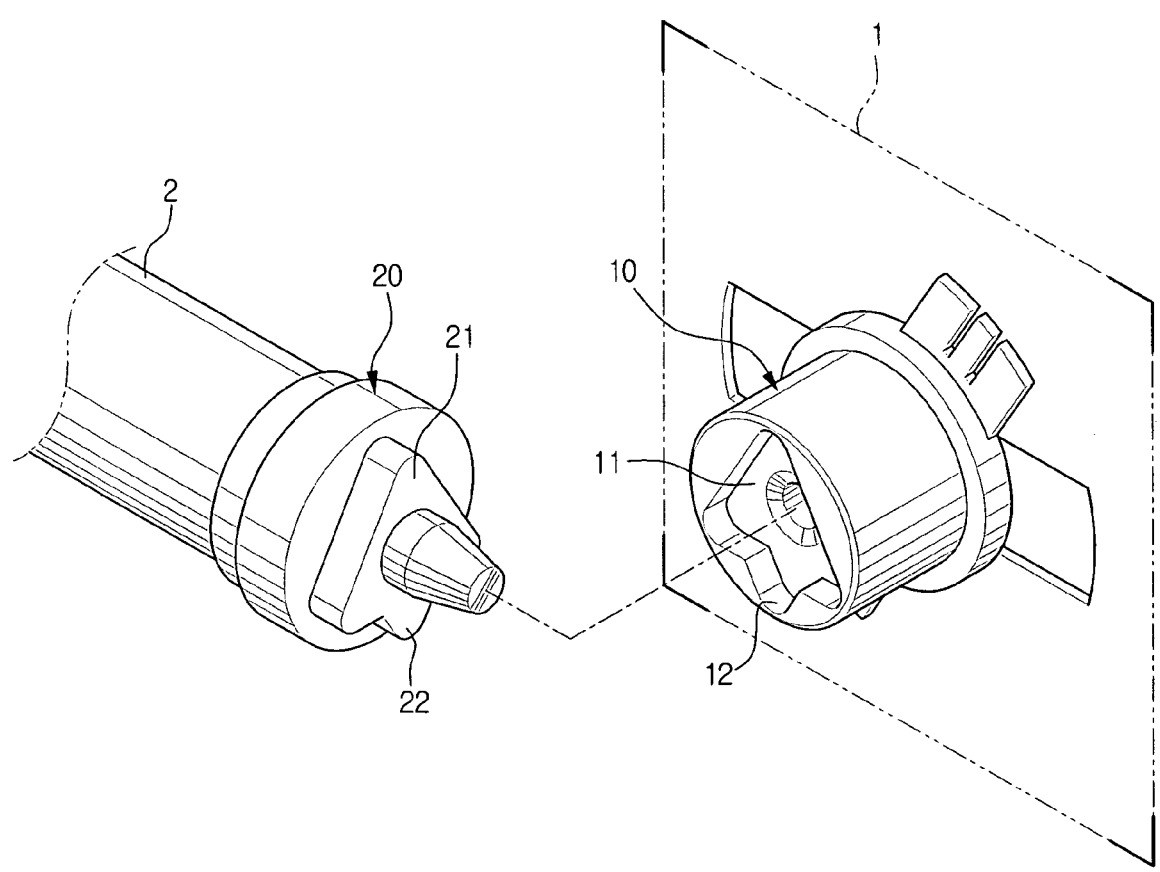
FIG. 1 is a schematic view of a conventional power coupling device of an image forming apparatus.
Figure 2A:
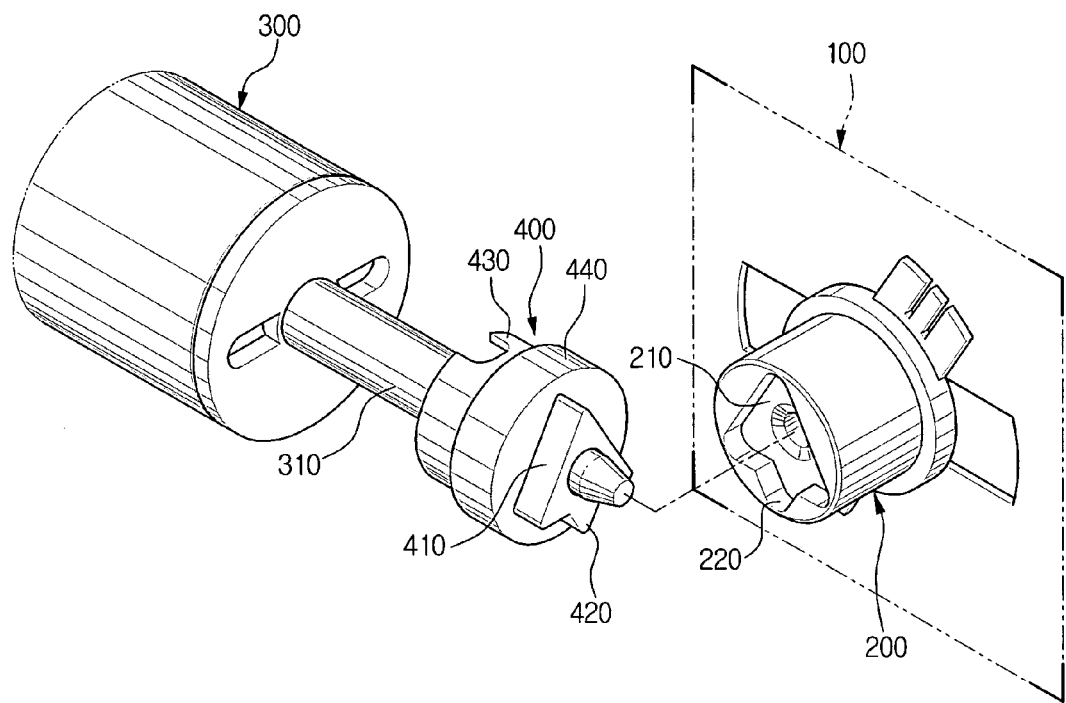
FIGS. 2A and 2B illustrate a power coupling device of an image forming apparatus, according to an embodiment of the present invention.
Figure 2B:
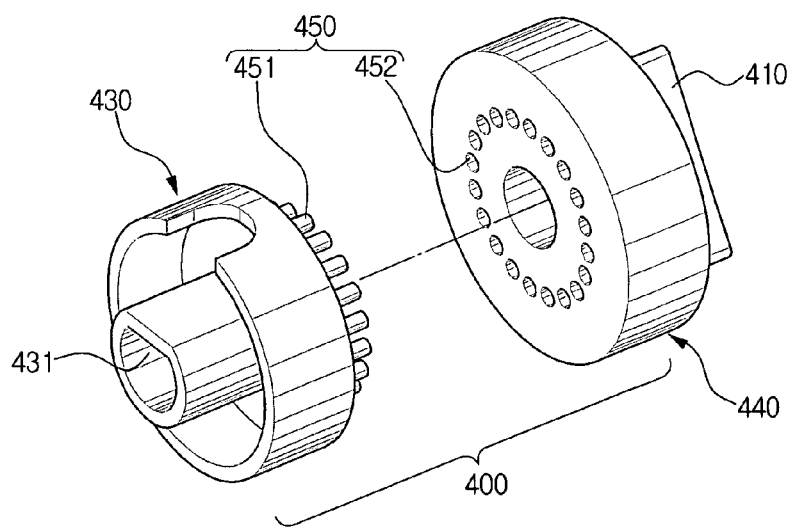

FIGS. 2A and 2B illustrate a power coupling device of an image forming apparatus according to an embodiment of the present invention. A reference number 100 denotes a driving unit as a driving part, 200 denotes a driving coupler, 300 denotes a photoconductive medium as a driven part, and 400 denotes a driven coupler.

As shown in FIG. 2A, the driving coupler 200 is provided to the driving unit 100 in the image forming apparatus and comprises a first connection part 210 depressed by a certain depth and having a non-circular section and a first positioning part 220 formed at one side of the first connection part 210, which is formed as a recess. Although the section of the first connection part 210 is substantially formed as a triangle in this embodiment, any other non-circular shape can also be applied.

The driven coupler 400 is mounted at one side of the photoconductive medium 300. The driven coupler 400 comprises a second connection part 410 and a second positioning part 420 to respectively correspond to the first connection part 210 and the first positioning part 220 of the driving coupler 200. The second connection part 410 is preferably protruded by a certain height and has a non-circular section, and the second positioning part 420 is protruded at one side of the second connection part 410.

The driven coupler 400 comprises a first coupler member 430, a second coupler member 440 and a connection means 450.

The first coupler member 430 is fixed to a shaft 310 of the photoconductive medium 300, and the second coupler member 440 is connected to the first coupler member 430 such that the connecting position can be adjusted by the connection means 450.

As shown in FIG. 2B, the first coupler member 430 may be fixed to the shaft 310 by a D-cut part 431, by a pin, a key or other suitable fixing means. The second coupler member 440 comprises the second connection part 410 and the second positioning part 420.

The connection means 450 conjoins the first and the second coupler members 430 and 440, so that the connecting position of the second coupler member 430 with respect to the first coupler member 430 is adjustable.

The connection means 450 comprises a plurality of projections 451 preferably formed on the first coupler member 430 and a plurality of depressions 452 preferably formed on the second coupler member 440 for the projections 451 to be correspondingly fit therein. The projections 451 and the depressions 452 may be formed in reverse or any other suitable fashion to connect the two members together.

Figure 3:
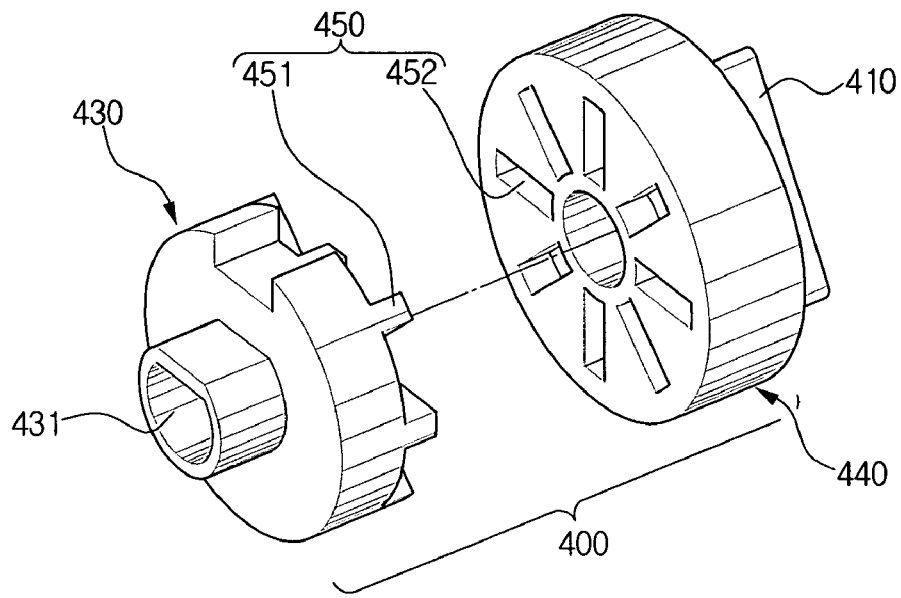
FIG. 3 illustrates a power coupling device of an image forming apparatus, according to another embodiment of the present invention.
Figure 4:
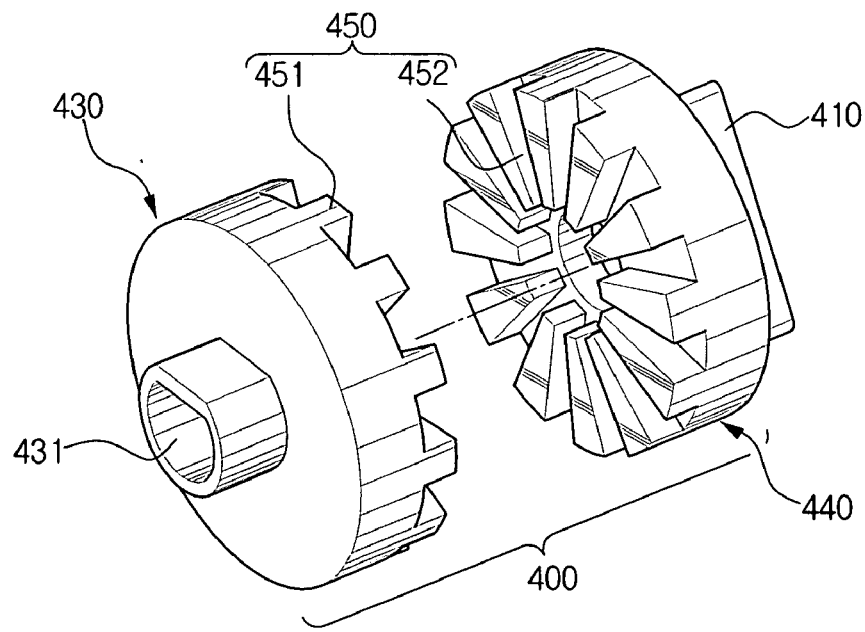
FIG. 4 illustrates a power coupling device of an image forming apparatus, according to yet another embodiment of the present invention.

The projections 451 and the depressions 452 may be implemented by pins and pin holes, however, the present invention is not limited to this embodiment. As shown in FIGS. 3 and 4, the projections 451 and the depressions 452 may be formed by square columns and square depressions or configured in other ways. The projections 451 and the depressions 452 can be connected in any projecting and depressing structures, including alternating depressions and projections, as long as the connection position thereof can be adjusted.

In a state that the first coupler member 430 is fixed to the shaft 310 of the photoconductive medium 300, the second coupler member 440 is connected using the above connection means 450 so that the second positioning part 420 thereof is located at the peak eccentric position of the photoconductive medium. As a result, the peak eccentric positions of the photoconductive medium of the respective colors can be correctly and easily united.

It is apparent that as the number of the projections 451 and depressions 452 increases, the connecting position can be controlled more minutely.

Figure 5:
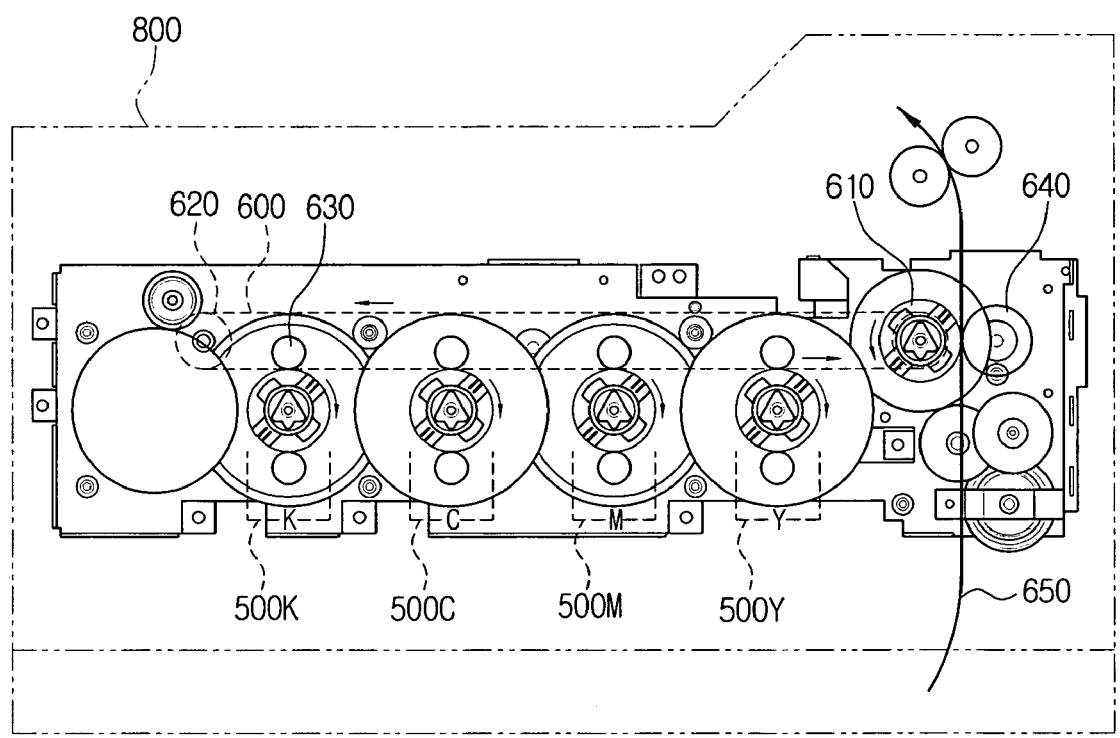
FIG. 5 is a schematic view illustrating an image forming apparatus adopting a power coupling device according to an embodiment of the present invention.
Figure 6:
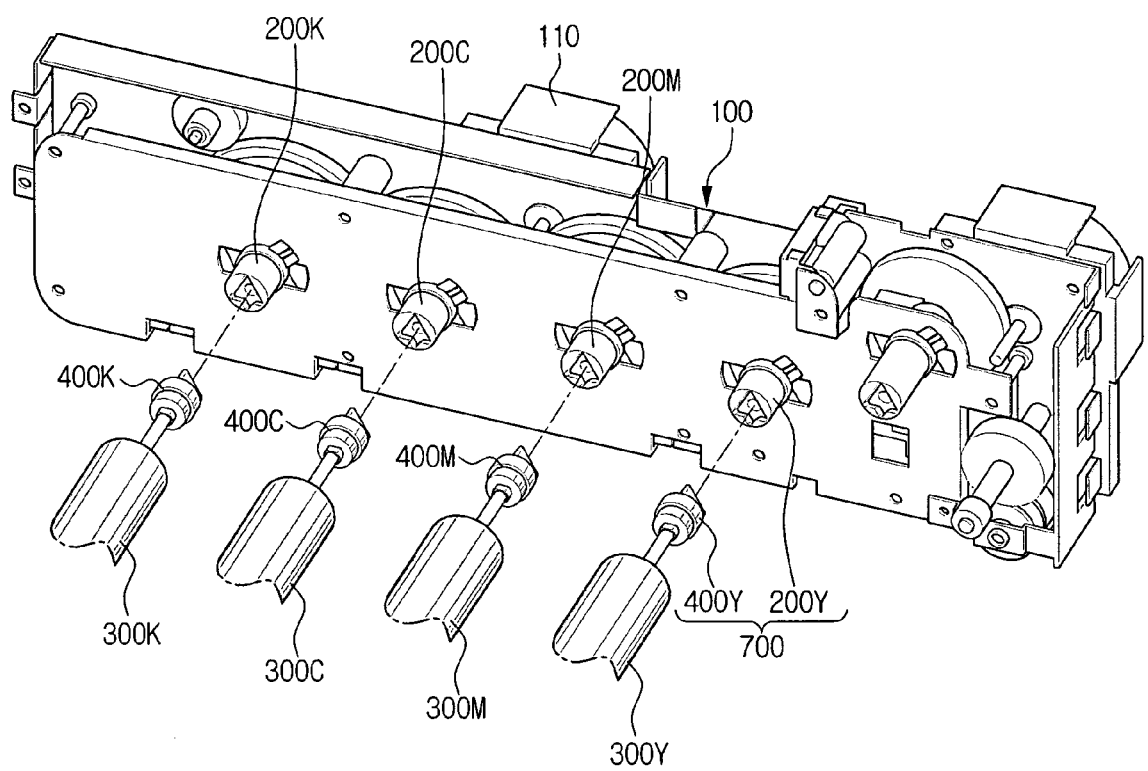
FIG. 6 is a perspective view of main parts of FIG. 5.

FIG. 5 is a view schematically illustrating an image forming apparatus employing the power coupling device according to an embodiment of the present invention, and FIG. 6 is a perspective view showing main parts of FIG. 5.

Referring to FIG. 6, the image forming apparatus according to an embodiment of the present invention comprises a driving unit 100, photoconductive mediums 300K, 300C, 300M and 300Y of four colors, developing units 500K, 500C, 500M and 500Y of four colors, an intermediate transfer belt 600 as an intermediate transfer medium and a power coupling device 700.

The driving unit 100 comprises a driving source 110, and driving couplers 200K, 200C, 200M and 200Y of four colors, which are rotated by the driving source 110. Since the driving couplers have been described hereinbefore, detailed description thereof will not be repeated.

The photoconductive mediums 300K, 300C, 300M and 300Y of four colors are disposed in a main body 800 (shown in FIG. 5) of the image forming apparatus in a certain order of colors. In this embodiment, they are arranged in an order of K (black), C (cyan), M (magenta) and Y (yellow), according to the moving direction of the intermediate transfer belt 600. Also, the driving couplers 200K, 200C, 200M and 200Y and driven couplers 400K, 400C, 400M and 400Y constructing the power coupling device 700 are mounted on one side of the photoconductive mediums 300K, 300C, 300M and 300Y, respectively. A detailed description of the structure of the driven couplers will be omitted since it has been made above.

Referring to FIG. 5, the developing units 500K, 500C, 500M and 500Y of four colors are disposed below the respective photoconductive mediums 300K, 300C, 300M and 300Y to form a color image on the photoconductive mediums 300K, 300C, 300M and 300Y. The developing unit is not an essential feature of the present invention and can be understood as well-known art. Therefore, a detailed description of the developing units has been omitted for the sake of clarity.

The intermediate transfer belt 600 is driven in one direction, being supported by a driving roller 610, a supporting roller 620 and a plurality of T1 rollers 630. The intermediate transfer belt 600 is sequentially transferred with the color images formed on the respective photoconductive mediums 300K, 300C, 300M and 300Y in an overlapping manner. Therefore, a full-colored image is transferred onto the intermediate transfer belt 600 that has finally passed through the photoconductive medium 300Y. The full-colored image is transferred to a printing medium 650 that passes between the intermediate transfer belt 600 and the T2 roller 640. The driving roller 610 is in connection with the driving unit 100 to receive rotational power and thereby move the intermediate transfer belt 600.

The respective photoconductive mediums 300K, 300C, 300M and 300Y of the image forming apparatus are hardly ever formed as an exactly circular shape due to either a manufacturing error and a forming error, and inevitably have eccentric portions. Therefore, the second coupler member 440 is connected with the first coupler member 430 by adjusting the connecting position of the second coupler member 440 of the respective driven couplers 400K, 400C, 400M and 400Y with respect to the first coupler member 430, such that unity of the peak eccentric positions are conveniently and correctly performed, which compensates the color registration in consideration of the manufacturing error and the forming error.

Even in the conventional image forming apparatus, unity of the peak eccentric positions of the respective photoconductive mediums was performed to compensate the color registration in consideration of the manufacturing error and the forming error. However, since an assembly error could not be taken into consideration using the conventional method, improvement of an image quality was limited.

Another embodiment that describes compensating the color registration in consideration of the assembly error of the photoconductive medium and the driving roller will now be described in more detail.

Figure 7:
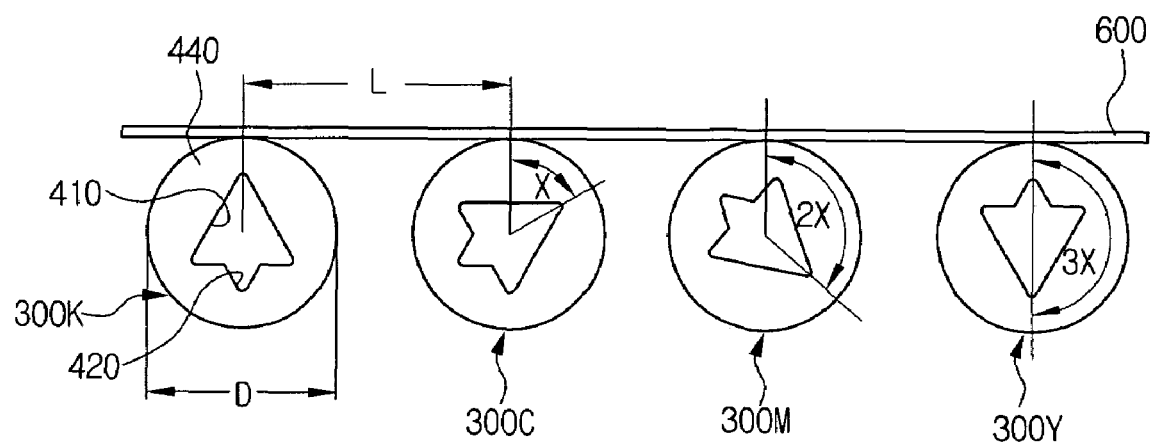
FIG. 7 is a view for illustrating an example of adjusting a power connection angle of the organic photoconductor (OPC) for different colors in an image forming apparatus employing the power coupling device according to an embodiment of the present invention.

More specifically, the second coupler member 440 of the respective driven couplers 400K, 400C, 400M and 400Y is positioned so that a certain point thereof, for example, the second positioning part 420 corresponds to the peak eccentric position of the photoconductive mediums 300K, 300C, 300M and 300Y. In addition, as shown in FIG. 7, the second coupler 440 of the respective driven couplers 300C, 300M and 300Y is rotated by a certain angle X°, 2X°, and 3X°, thereby enabling compensation of the color registration in consideration of the assembly error as well.

Here, the certain angle X° can be calculated by equation 1 as was described above, but is reproduced below for the sake of convenience:

$$X° = [360° \times \pi \times (D-L)]/(\pi \times D)$$

Equation 1 wherein, D denotes a diameter of the photoconductive medium, and L denotes a distance between centers of the photoconductive mediums.

According to the embodiment as described above, even though a circumferential length of the photoconductive medium ($\pi \times D$) does not correspond to the distance L between the centers of the photoconductive mediums, the color registration can be minimized, thereby improving the image quality.

As can be appreciated from the above description, the power coupling device and the image forming device having the same are able to control the manufacturing error and/or the forming error of the photoconductive mediums to be generated in every certain period with respect to the moving direction of the intermediate transfer belt 600. Therefore, the quality of the composite color image can be improved. In addition, according to an embodiment of the present invention, since the assembly error is also considered in compensating the color registration, the image quality can be more enhanced.

Accordingly, the peak eccentric positions of the photoconductive mediums for respective colors can be regulated more correctly and conveniently without requiring a complicated controlling device or a controlling algorithm, for compensation of the color registration considering the manufacturing error and the forming error.

In other words, the effort of correctly corresponding the eccentric positions of the driven couplers and the photoconductive mediums to each other, as required when using the conventional photoconductive medium, can be saved. Furthermore, a grouping process for corresponding the peak eccentric positions of the photoconductive mediums is not required, thereby enhancing assembly of the image forming apparatus.

Certain embodiments, in which the driven coupler 400 separately comprises the first and the second coupler members 430 and 440, have been described so far. However, according to yet another embodiment of the present invention, the power coupling device can include the driving coupler 200 separately comprising first and second coupling members 230 and 240, which are displaceably connected by a connection means 250, as shown in FIGS. 8A and 8B.

Figure 8A:
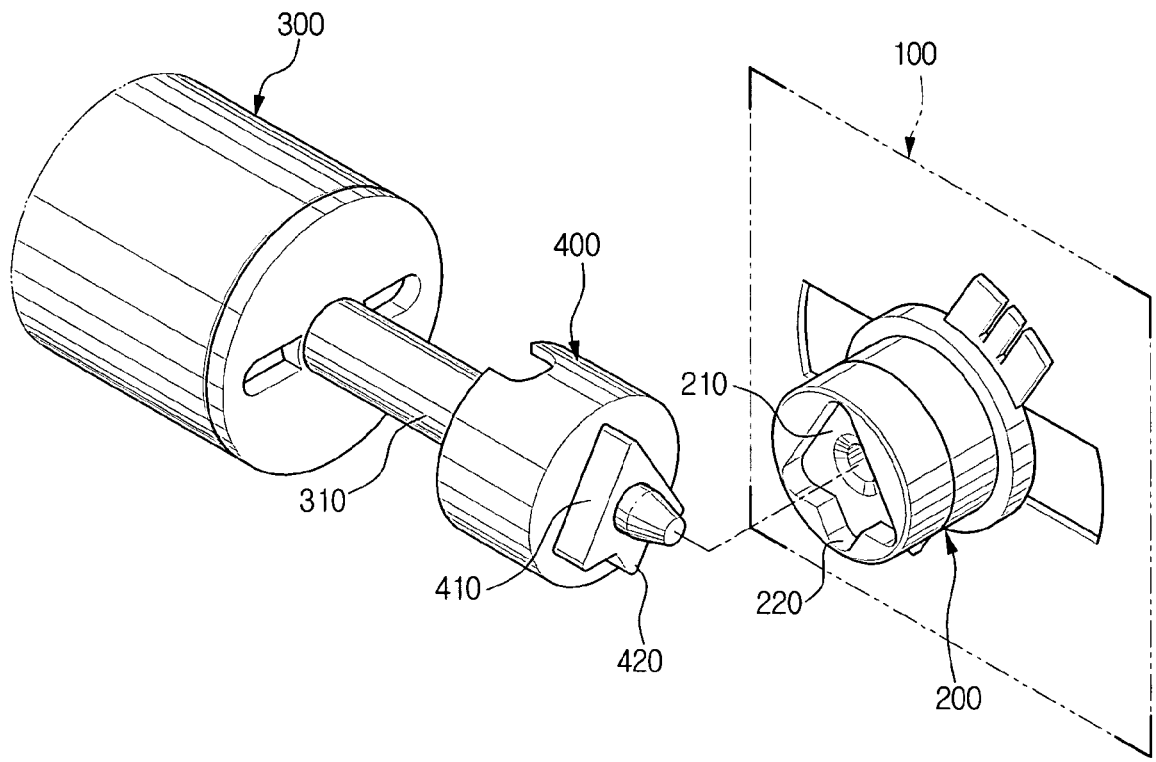
FIGS. 8A and 8B are views showing a power coupling device according to still another embodiment of the present invention.
Figure 8B:
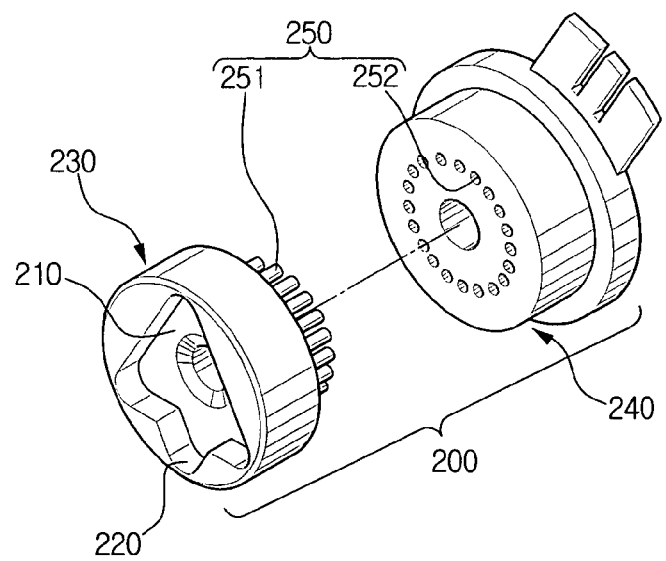

Referring to FIGS. 8A and 8B, the driving coupler 200 comprises the first coupler member 240, the second coupler member 230 and the connection means 250. The first coupler member 240 is fixed to the driving part 100. The second coupler member 230, for connection with the driven coupler 400, has the first connection part 210 and the first positioning part 220. In addition, in the same manner as the previous embodiments, the connection means 250 comprises a plurality of protrusions 251 formed at one end of the first and the second coupler member 230 and 240 and a plurality of recesses 252 formed at the other end of the first and the second coupler members 230 and 240.

The driven coupler 400 comprises the second connection part 410 and the second positioning part 420, which are fixed to the driven part such as the photoconductive medium 300 corresponding to the first connection part 210 and the first positioning part 220 of the driving coupler 200, respectively.

Except for the connection means 250, which is an essential feature of the present embodiment, the other structures and effects of this embodiment are the same as those described with respect to the other embodiments. Therefore, a detailed description has been omitted for the sake of conciseness.

While the invention has been shown and described with reference to certain embodiments thereof, it will be understood by those skilled in the art that various changes in form and details may be made therein without departing from the spirit and scope of the invention as defined by the appended claims.

What is claimed is:

1. A power coupling device for transferring the power of a driving part to a driven part, comprising:
   a driving coupler mounted in the driving part and comprising a first connection part and a first positioning part formed at one side of the first connection part; and
   a driven coupler mounted in the driven part and comprising a second connection part and a second positioning part respectively corresponding to the first connection part and the first positioning part,
   wherein the driven coupler comprises:
      a first coupler member fixed to the driven part;
      a second coupler member having the second connection part and the second positioning part for connection with the first connection part and the first positioning part, respectively, and
      a connection means for connecting the first coupler member with the second coupler member so that a connecting position of the second coupler member with respect to the first coupler member can be controlled.

2. The power coupling device of claim 1, wherein the connection means comprises:

a plurality of projections formed at one of the first and the second coupler members; and a plurality of depressions formed at the other one of the first and the second coupler members for the plurality of projections to be forcibly fit therein.

3. The power coupling device of claim 2, wherein the projections and the depressions are formed by pins and pin holes, respectively.

4. The power coupling device of claim 3, wherein the projections and the depressions are formed by square pins and square pin holes, respectively.

5. The power coupling device of claim 2, wherein the driven part comprises a rotation shaft, and the first coupler member is fixed to the rotation shaft by a D-cut part, a pin or keyed part.

6. The power coupling device of claim 2, wherein the driven part has a peak eccentric position, and the second coupler member is positioned with respect to the first coupler member so that the second positioning part thereof corresponds to the peak eccentric position.

7. The power coupling device of claim 6, wherein the driven part is a photoconductive medium, and the driving part is a driving unit of an image forming apparatus.

8. The power coupling device of claim 7, wherein the first connection part of the driving coupler has a non-circular section.

9. The power coupling device of claim 8, wherein the first connection part of the driving coupler is formed as a substantially triangular recess, and the second connection part of the driven coupler is formed as a substantially triangular protrusion to correspond to the substantially triangular recess.

10. The power coupling device of claim 9, wherein the first positioning part of the driving coupler is formed as a recess, and the second positioning part of the driven coupler is formed as a protrusion.

11. An image forming apparatus comprising:
four photoconductive mediums for four different colors, being removably mounted in a main body thereof
a driving unit having four driving couplers for four different colors, the driving couplers comprising a first connection part depressed by a certain depth and having a non-circular section and a first positioning part formed at one side of the first connection part, so as to rotate the photoconductive mediums; and
four driven couplers for four different colors, respectively mounted at the four photoconductive mediums to be coupled with the respective driving couplers,
wherein the four driven couplers respectively comprise,
a first coupler member fixed to the photoconductive medium,
a second coupler member having the second connection part and the second positioning part corresponding to the first connection part and the first positioning part and connected with the first coupler member, and
a connection means for connecting the first coupler member with the second coupler member so that a connecting position of the second coupler member with respect to the first coupler member can be controlled, and
the four second coupler members are positioned with respect to the first coupler member so that the second positioning parts thereof correspond to peak eccentric position of the photoconductive mediums, respectively.

12. The image forming apparatus of claim 11, wherein the second coupler members are rotated by a certain angle X° which is calculated by the following equation for connection with the first coupler members:

$$X° = [360° \times \pi \times (D-L)]/(\pi \times D)$$

wherein, D denotes a diameter of the photoconductive medium, and L denotes a distance between centers of the photoconductive mediums.

13. The image forming apparatus of claim 12, wherein the connection means composes:
a plurality of projections formed at one of the first and the second coupler members; and
a plurality of depressions formed at the other one of the first and the second coupler members for the plurality of projections to be forcibly fit therein.

14. The image forming apparatus of claim 13, wherein the projections and the depressions are formed by pins and pin holes, respectively.

15. The image forming apparatus of claim 14, wherein the pins and pin holes are square, circular, hexagonal, triangular or rectangular in shape.

16. The image forming apparatus of claim 12, wherein the photoconductive medium comprises a rotation shaft, and the first coupler member is fixed to the rotation shaft by a D-cut part, a pin or keyed part.

17. A power coupling device for transferring the power of a driving part to a driven part, comprising:
a driving coupler mounted in the driving part and comprising a first connection part and a first positioning part formed at one side of the first connection part; and
a driven coupler mounted in the driven part and comprising a second connection part and a second positioning part respectively corresponding to the first connection part and the first positioning part,
wherein the driving coupler comprises:
a first coupler member fixed to the driving part;
a second coupler member having the first connection part and the first positioning part for connection with the second connection part and the second positioning part, respectively, and
a connection means for connecting the first coupler member with the second coupler member so that a connecting position of the second coupler member with respect to the first coupler member can be controlled.

* * * * *